(12) United States Patent
Duncan et al.

(10) Patent No.: US 6,835,913 B2
(45) Date of Patent: Dec. 28, 2004

(54) HARDSURFACING WELDING WIRE AND PROCESS

(75) Inventors: Daryl L. Duncan, Troy, OH (US); Joseph C. Bundy, Piqua, OH (US)

(73) Assignee: Hobart Brothers Company, Troy, OH (US)

( * ) Notice: Subject to any disclaimer, the term of this patent is extended or adjusted under 35 U.S.C. 154(b) by 0 days.

(21) Appl. No.: 10/248,934

(22) Filed: Mar. 3, 2003

(65) Prior Publication Data

US 2004/0173592 A1 Sep. 9, 2004

(51) Int. Cl.[7] ................................................ B23K 9/00
(52) U.S. Cl. ..................... 219/137 WM; 219/146.1; 219/145.1; 219/145.22
(58) Field of Search ............... 219/137 WM, 219/146.1, 145.1, 145.22

(56) References Cited

U.S. PATENT DOCUMENTS

| | | | | |
|---|---|---|---|---|
| 2,510,205 | A | * 6/1950 | Baird ..................... | 219/137.42 |
| 2,906,860 | A | * 9/1959 | Steele ..................... | 219/130.4 |
| 3,180,969 | A | * 4/1965 | Williams ................ | 219/137 R |
| 3,344,305 | A | * 9/1967 | Ogden et al. ............ | 314/69 |
| 5,120,931 | A | * 6/1992 | Kotecki et al. .......... | 219/146.22 |
| 5,365,036 | A | 11/1994 | Crockett et al. | |
| 5,861,605 | A | 1/1999 | Ogawa et al. | |
| 5,914,061 | A | * 6/1999 | Ogawa et al. ........... | 219/145.22 |
| 5,945,064 | A | 8/1999 | Komai et al. | |
| 6,124,569 | A | 9/2000 | Bonnet et al. | |

FOREIGN PATENT DOCUMENTS

GB  2 253 804 A  3/1992

* cited by examiner

Primary Examiner—M. Alexandra Elve
(74) Attorney, Agent, or Firm—Houston Eliseeva LLP

(57) ABSTRACT

A welding wire comprising a flux core having a core composition alloyed with a combination of alloying elements is described. The alloying elements comprise Cr and N, wherein the flux core comprises between 10% and 50% of the total weight of the weld wire. A metal sheath encapsulates the flux core, wherein the metal sheath comprises between about 90% and 50% of the total weight of the welding wire and wherein the welding wire can be used in a welding process without destabilizing a welding arc. One of the applications of the wire and welding process of the present invention is hard surfacing of the steel mill rolls, which are hollow cylinders usually on continuous casters. As an example, the rolls welded by the wire and method of the present invention can have a diameter of about 12 inches or less. Additionally, a welding apparatus comprising a welding gun with a device for feeding an electrode into the welding gun is described. The corresponding welding process calls for gas shielding of the electrode to reduce spatter and smoke emission while creating a smooth weld bead surface requiring less grinding and finishing. The resulting weld deposit has enhanced resistance to pitting corrosion.

25 Claims, 5 Drawing Sheets

HARDSURFACING WELDING WIRE AND PROCESS

BACKGROUND OF INVENTION

The present invention relates generally to the field of flux cored arc welding (FCAW) and more particularly to the composition of the weld wires used in the FCAW process.

Flux core arc welding is a welding process which joins, or welds, metals together via an electrical arc established between a continuous metal electrode and a metal work piece. The metal electrode used in the FCAW process is usually a consumable electrode which is fed into the FCAW process as fast as it is consumed. As mentioned above, the FCAW process operates by causing an electrical potential difference to build up between the electrode and the work piece. As the electrode approaches the work piece, the electrical potential difference between the electrode and the work piece causes a current to flow in the electrode and an electric arc to develop between the tip of the electrode and the metal surface of the work piece. This current flow heats up and melts the electrode and the surface of the work piece, generating the flow of the filler metal toward the metal surface. As the filler metal and the work piece cool, a bond or weld is formed on the metal surface of the work piece.

Referring to FIG. 1, an example of a welding gun and an arrangement for FCAW is schematically shown and discussed. A consumable welding electrode 100 is fed into the welding process through a welding gun 102 having a gas nozzle 104. Electrode 100 is melted into molten metal 106 by an electrical arc 108 established between electrode 100 and a work piece 110. An externally supplied gas, such as Ar or $CO_2$ or mixtures thereof, enters the welding process through gas nozzle 104 in welding gun 102 and shields the electrical arc 108, the tip of electrode 100 and the pool of molten metal 106 by forming a gas shield 116. The advantages of the FCAW process include a high quality weld that can be produced faster and with very little spatter and loss of alloying elements due to the gas shield and a stable electrical arc.

The consumable electrode in FIG. 1, which is melted by the electrical arc, is transported by the arc to the work piece to serve as a surfacing or cladding material. The arc produces the heat for the welding process and is maintained by the electron flow between a cathode (positive terminal) and an anode (negative terminal). In the FCAW process both the consumable electrode and the work piece can function as a cathode or an anode.

One way to stabilize the arc in the FCAW process is by altering the composition of the welding wire electrode to add fluxing and alloying elements. Wires for FCAW are flux-cored wire electrodes comprising a flux filler core encapsulated by a metal sheath. The core of the wire electrode is made of fluxing and alloying compounds which become deposited weld materials. The composition of the core affects the composition and physical characteristics of the weld metal. Fluxing and alloying compounds contained in the core are selected to function as deoxidizers, alloying elements and arc stabilizers, and may provide additional shielding gas, such as $CO_2$. Flux cored wires provide the ability to add various materials to the core in order to improve the welding characteristics and conditions of the FCAW process. Therefore, it would be desirable to have an electrode wire having a flux core composition affecting creation and maintenance of a stable arc in the FCAW process while exhibiting the desired high deposition and fast fill characteristics.

It is known that a submerged arc process currently used to hard surface such work pieces as steel mill rolls often generates too much heat on smaller diameter rolls. As a result, the molten metal tends to slide off the surface. The resulting bead turns out to be rough and requires labor intensive finishing to obtain a surface of suitable quality.

It is also known that an open-arc process in common use today is prone to produce excessive amounts of smoke and spatter and often results in poor quality welds that may contain porosity. It would be desirable, therefore, to find a way to hard surface smaller work pieces by improving the quality of the weld beads and reducing the post-welding finishing and machining of the resurfaced work piece.

SUMMARY OF INVENTION

The present invention provides a welding wire comprising a core produced from powdered materials. The flux core comprises a composition alloyed with a combination of alloying and fluxing elements comprising Cr and N. Other alloying elements important for hard surfacing can be, among others, Mo (which enhances corrosion resistance at higher temperatures), Nb (which facilitates formation of stable niobium carbides, reducing the percentage of available C in the weld deposit, therefore, reducing the likelihood of formation of chromium carbides susceptible to pitting corrosion). Fluxing compounds are present in the core composition to form slag, act as arc stabilizers, provide deoxidization and additional arc shielding during their decomposition. The flux core can constitute between 10% Wt and 50% Wt of the welding wire. The present invention also comprises a metal sheath encapsulating the flux core and constituting between 90% Wt and 50% Wt of the welding wire. The alloying elements can be added to the core or to the sheath of the wire, depending on a particular application or manufacturing process. The sheath material used to manufacture the wires can be mild steel, 300 Series stainless steel, or 400 Series stainless steel. The composition of the welding wire makes it possible to use the wire in the FCAW welding process without destabilizing the welding arc. One of the advantages of using nitrogen as an alloying element in the flux core is the fact that nitrogen-containing weld deposits resist pitting corrosion much better than the weld deposits without nitrogen. It is thought that replacing carbon with nitrogen in the flux core of the welding wire reduces the susceptibility of the resulting weld to pitting corrosion.

Additionally, the present invention contemplates a welding apparatus comprising a welding gun having a device for feeding an electrode into the welding gun. The electrode comprises a metal sheath encapsulating a flux core having a core composition, wherein the core composition is alloyed with a combination of alloying and fluxing elements comprising Cr and N, as well as others, and wherein the flux core constitutes between approximately 10% and 50% of the total weight of the wire electrode. The welding apparatus has means for shielding the electrode during the welding process by using a gas shield. The gas shield can comprise $CO_2$, or a mixture of Ar and about 5% to 25% of $CO_2$. According to the invention, a welding process utilizing the novel welding wire is provided. The process comprises obtaining an electrode, comprising a metal sheath encapsulating a flux core. The flux core has a composition comprising fluxing and alloying elements, such as Cr and N. Additionally, the welding process comprises using a welding apparatus with a device for feeding the electrode into the welding apparatus and a device for supplying a shielding gas into the welding apparatus. The present FCAW process uses a shielding gas to shield the nitrogen-bearing electrode from the surrounding environment during welding. The welding process comprises connecting the welding apparatus to a power source, operating the welding apparatus to generate an arc, feeding the electrode into the welding apparatus and supplying the shielding gas to the welding apparatus to shield the electrode and the arc.

One of the applications of the wire and welding process of the present invention is hard surfacing of continuous caster steel mill rolls. These are often small diameter hollow cylinders. As an example, the rolls welded by the wire and method of the present invention can have a diameter of about 4 inches to 12 inches.

Such smaller hollow body rolls are hard to weld by employing the traditional submerged arc welding typically used for larger steel mill rolls. On smaller rolls the submerged arc welding process generates excessive amounts of heat, which causes the surface of the metal work piece to stay molten too long to result in a clean weld.

The open arc, flux cored process presents it's own set of problems, which may include excessive smoke, excessive spatter, and porosity of the deposited weld metal. Both processes often produce poorer quality beads needing further machining and finishing.

The gas-shielded FCAW process generates less heat and makes it possible for the weld beads to stay on the surface of a roll, forming a smoother surface and requiring less post-welding grinding and finishing. With the wire and method of the present invention, the hard surfacing alloying elements produce a cleaner, porosity free weld with little smoke, low spatter, and smoother beads, resulting in less after welding finishing work.

The above discussed and other features and advantages of the present invention will be appreciated and understood by those skilled in the art from the following detailed description and drawings.

BRIEF DESCRIPTION OF DRAWINGS

Referring to the exemplary drawings wherein like elements are numbered alike in the several Figures.

DETAILED DESCRIPTION

It has been discovered that in a conventional FCAW apparatus, a nitrogen-bearing welding wire of the novel composition provides a cleaner weld, good deposition rate, lower spatter, and less smoke, which is advantageous to the stability of the arc and the transfer of the droplets. Although the flux cored wire of the present invention is a welding wire which may be used in a FCAW process with a recommended shielding gas comprising $CO_2$, Ar or a mixture thereof, the preferred shielding gas comprises 100% of $CO_2$. The welding wire of the present invention exhibits a high deposition rate (about 30–40% higher than solid wire electrodes), a high travel speed (about 30–40% higher than solid wire electrodes) and is well suited for semi-automatic, automatic and robotic welding on work pieces such as low alloy steel rolls. In particular, the low alloy steel can be AISI 4140.

Figure 1:
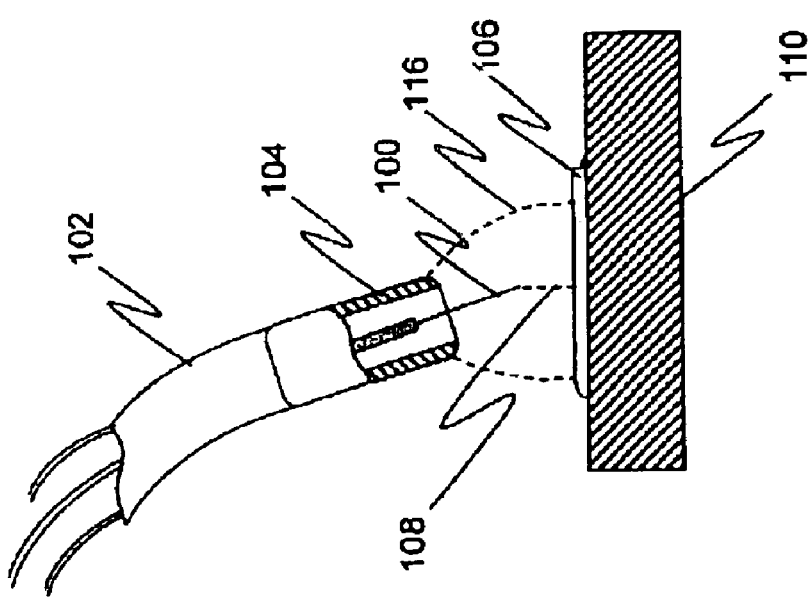
FIG. 1 is a schematic illustration of a welding gun nozzle and a work piece.
Figure 2:
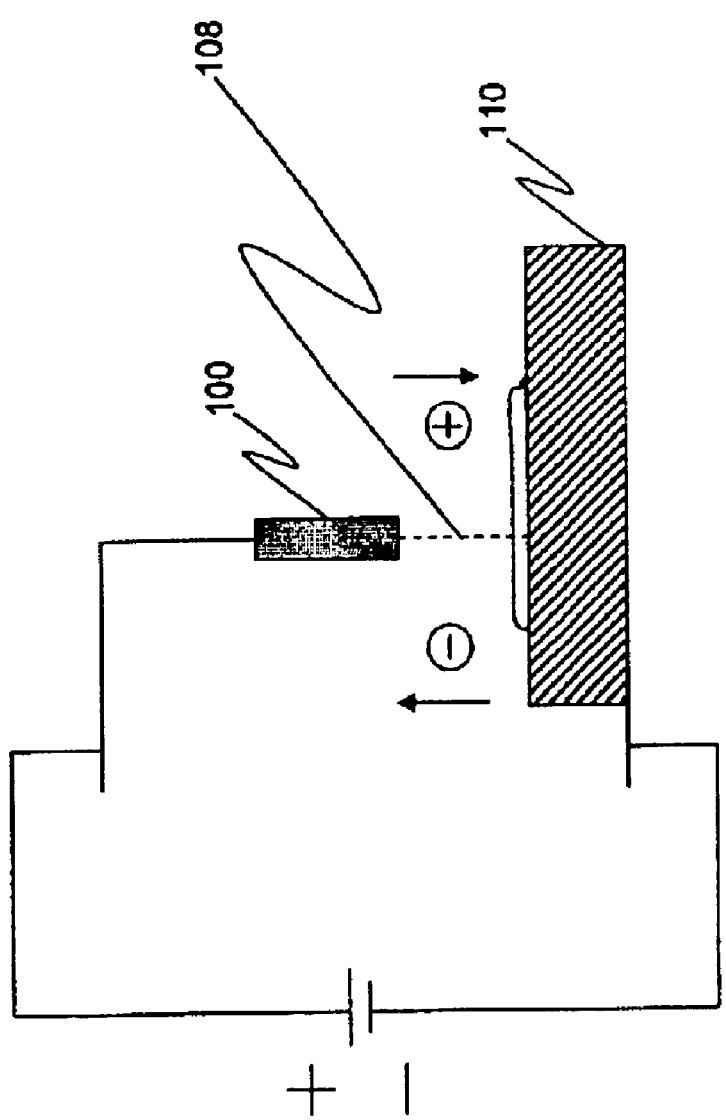
FIG. 2 shows a welding apparatus having a DCEP welding configuration.
Figure 3:
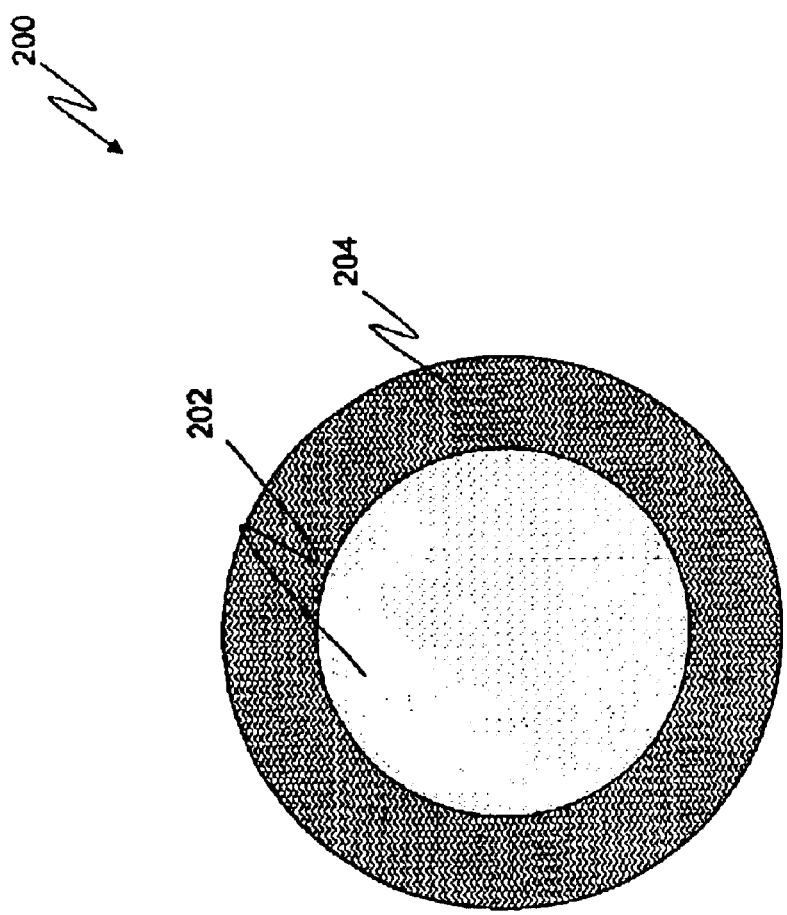
FIG. 3 is a cross sectional view of a welding wire showing a flux core and a metal sheath.

Referring to FIG. 3, a cross sectional view of a welding wire (also referred to as an electrode or a wire electrode) 200 is shown and comprises a metal sheath 204 encapsulating a flux core 202. Flux core 202 is typically made of a compacted powdered material and has a pre-selected chemical composition. The composition of flux core 202 comprises an alloying combination comprising nitrogen and chromium, as well as other alloying and fluxing elements and compounds to facilitate hard surfacing and reduce pitting corrosion. It is contemplated by the present invention that the nitrogen and/or chromium can be present in the core homogeneously or heterogeneously in the form of clusters, strands or other suitable configuration. Flux core 202 preferably accounts for about 10% Wt to 50% Wt of welding wire 200 and includes a flux core composition alloyed with a combination of alloying elements. Referring to Table 1 and in accordance with the preferred embodiment, alloying element Cr may be selected from the range of about 10% to about 20% Wt of flux core 202. Additionally, alloying element N may be selected from the range of about 0.04% Wt to about 0.2% Wt of flux core 202. The remaining portion of the composition of flux core 202 preferably comprises the alloying elements in the concentrations shown in Table 1.

TABLE 1

| Wire composition ranges (% Wt) | |
|---|---|
| Element/Compound | Percentage of Total Wire |
| Fe | 50.0–75.0 |
| Cr | 10.0–20.0 |
| Ni | 0–6.0 |
| Mn | 1.0–3.0 |
| Si | 0.2–1.0 |
| Mg | 0.2–1.0 |
| Ti | 0.2–1.0 |
| Mo/W/Co | 0.2–0.6 |
| Nb/V | 0–0.4 |
| N | 0.04–0.2 |
| C | 0–0.2 |
| Al | <.5 |
| $CaF_2$ | 0–6.0 |
| $TiO_2$ | 0–5.0 |
| $SiO_2$ | 0–3.0 |
| $Na_3AlF_6$ | 0–1.5 |
| CaO | 0.5–1.5 |
| $K_2SiF_6$ | 0.2–1.5 |
| $CaCO_3$ | 0–1.5 |
| $MgCO_3$ | <.5 |
| $Al_2O_3$ | <.5 |
| $K_2O$ | <.5 |
| $Na_2O$ | <.5 |
| $Fe_2O_3$ | <.5 |
| FeO | <.5 |
| $ZrO_2$ | <.5 |
| $V_2O_5$ | <.5 |
| MnO | <.5 |

The alloying and fluxing elements and compounds listed in Table 1 could be present in flux core 202 and metal sheath 204. The percentage of the core of the wire can vary between about 10% Wt to about 50% Wt and can be calculated as follows:

% Wt core=(weight(sheath+core)weight(core))/(weight(sheath+core))×100

Figure 4:
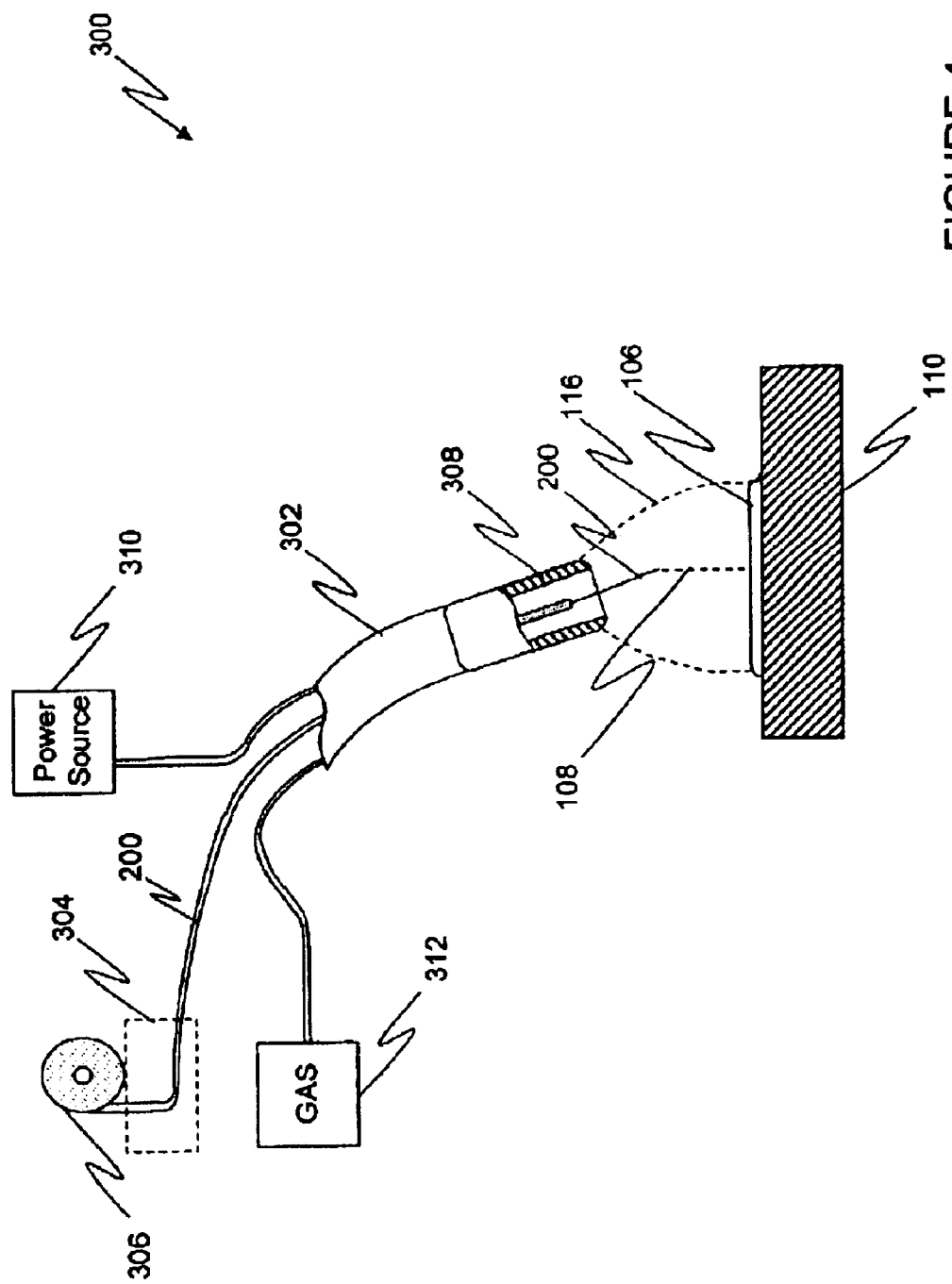
FIG. 4 is a schematic illustration of a welding apparatus employing the welding wire of FIG. 3.

Referring to FIG. 4, a FCAW apparatus 300 is shown utilizing welding wire 200 and comprising a welding gun 302 having a means for feeding electrode 200 into welding gun 302. Although an example of the means for feeding electrode 200 into welding gun 302 is shown in FIG. 4 is a wire drive 304 and a wire reel 306, it should be understood that any other method and/or device for feeding electrode 200 into welding gun 302 falls within the scope and spirit of the present invention. A shielding gas is supplied to the welding process through a gas nozzle 308 in the welding gun 302. Additionally, a power source 310 is provided for supplying electrical current to electrode 200, wherein power source 310 is preferably an alternating current power source. For the FCAW process in which welding gun 302 is coupled to power source 310, the preferred shielding gas is $CO_2$. However, any suitable shielding gas or mixture of shielding gases suitable to the desired end purpose may be used, such as $CO_2$ mixed with Ar. Moreover, it is contemplated that the shielding gas can be supplied to the welding process from an external source 312, also as shown in FIG. 5.

Figure 5:
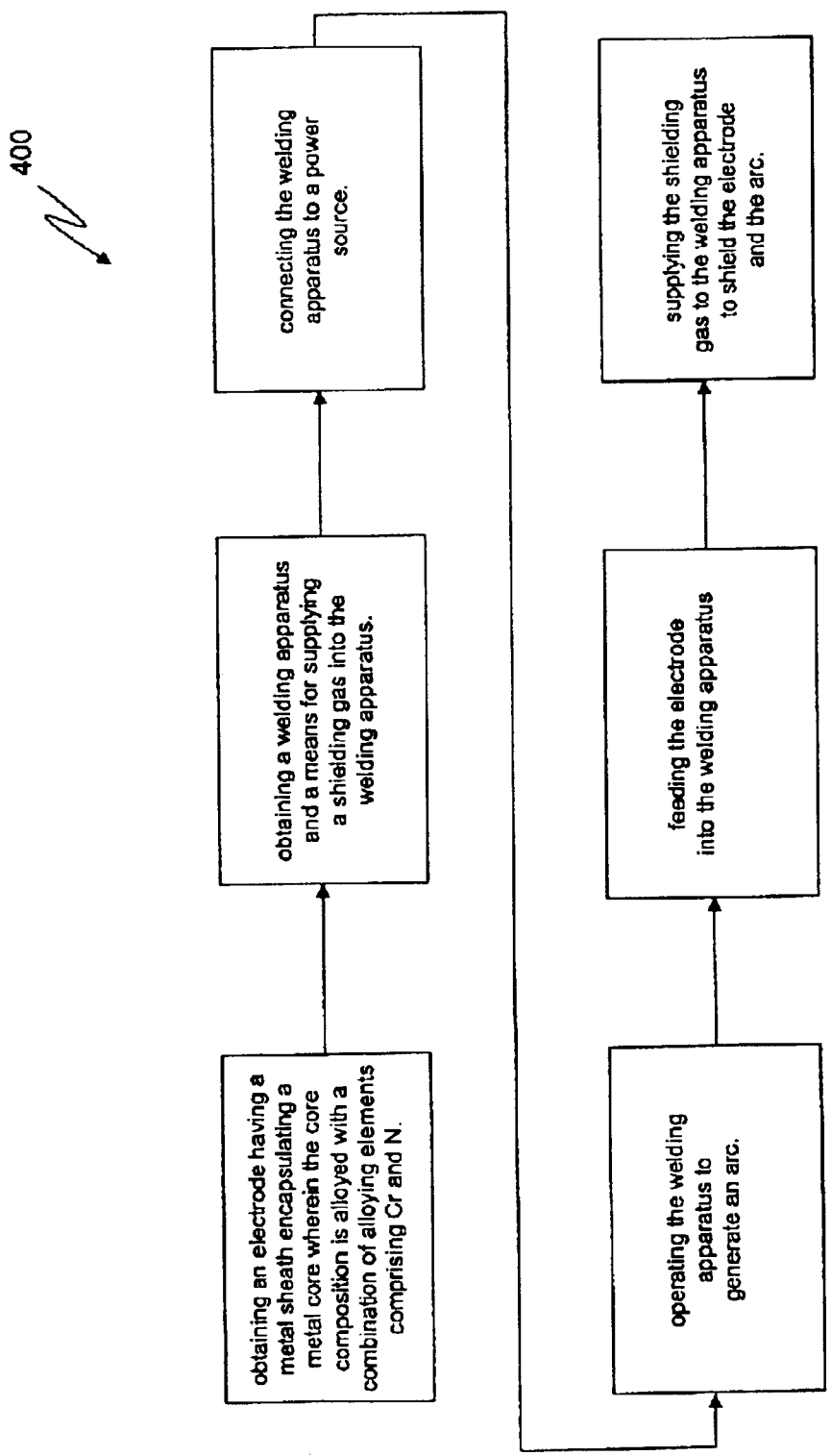
FIG. 5 is a block diagram illustrating a flux core arc welding (FCAW) process.

Referring to FIG. 5, a welding process 400 employing welding apparatus 300 and welding wire 200 is shown and discussed. Welding process 400 is accomplished by welding apparatus 300, electrode 200, means for feeding electrode 200 into welding gun 302 and an external source 312 for supplying a shielding gas. Means for feeding electrode 200 into welding gun 302 is shown in FIG. 4 as a wire drive 304 and a wire reel 306. Welding apparatus 300 is then connected to a power source 310 and welding apparatus 300 is operated to generate an arc between the tip of electrode 200 and the work piece 110. Because electrode 200 is a consumable electrode, it is fed into welding apparatus 300 via wire drive 304 and wire reel 306. As welding process 400 progresses, external source 312 supplies a shielding gas to the area around the tip of electrode 200, advantageously preventing impurities within the surrounding environment from contaminating the resultant weld. Upon completion of welding process 400, welding process 400 can be repeated, if desired.

In an exemplary embodiment, a two step welding process is used. In the process of the exemplary embodiment the addition of N to the composition of the flux core results in a hard surfacing effect and a cleaner, stronger weld. The process is accomplished by producing a first weld using a first electrode, then producing a second weld using a second electrode. The composition of both electrodes can be selected from the ranges of acceptable ranges of elements and compounds listed in Table 1. Once the first weld is complete, the second weld is performed, leaving a total concentration of Cr for both welds at about 12% Wt–13% Wt of chromium. The first welding wire preferably comprises a relatively high concentration of Cr (approximately 18.8% Wt), resulting in the first weld layer having of about 12% Wt–13% Wt of chromium. The second welding wire preferably has a lower concentration of Cr (approximately 13.3% Wt). When both welds are complete, the composition of the 2-layer deposited weld is preferably within the ranges as shown in Table 2.

TABLE 2

Composition of a 2-layer deposited weld on a work piece.

| ELEMENT | PERCENTAGE |
| --- | --- |
| C | 0.03–0.2 |
| Cu | 0–0.1 |
| Al | 0–0.1 |
| Mn | 0.5–1.5 |
| Cr | 11.0–13.5 |
| Ti | 0–0.1 |

TABLE 2-continued

Composition of a 2-layer deposited weld on a work piece.

| ELEMENT | PERCENTAGE |
| --- | --- |
| Ni | 1.0–3.0 |
| Nb/V | 0.1–0.4 |
| Si | 0.2–1.0 |
| Mo/W/Co | 0.1–0.4 |
| N | 0.05–0.15 |

While the invention has been described with reference to its exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the scope thereof. Therefore, it is intended that the invention not be limited to the particular embodiment disclosed as the best mode contemplated for carrying out this invention, but that the invention will include all embodiments falling within the scope of the appended claims. Moreover, unless specifically stated any use of the terms first, second, etc. do not denote any order or importance, but rather the terms first, second, etc. are used to distinguish one element from another.

What is claimed is:

1. A welding wire comprising:

a flux core being having a core composition alloyed with a combination of alloying elements comprising between about 10% Wt and 20% Wt of Cr and between about 0.04% Wt and about 0.2% Wt of N, wherein the flux core comprises between about 10% Wt and 50% Wt of the total weight of the weld wire; and a metal sheath encapsulating the flux core, the metal sheath having a metal sheath composition comprising approximately between about 0% Wt and 20% Wt of Cr and between about 0% Wt and 0.2% Wt of N, wherein the metal sheath comprises between about 90% Wt and 50% Wt of the welding wire.

2. The welding wire of claim 1, wherein a concentration of N is between about 0.07% Wt and 0.12% Wt.

3. The welding wire of claim 1, wherein the core composition and the metal sheath composition comprise:

| Element/Compound | Percentage of Total Wire |
| --- | --- |
| Fe | 50.0–75.0 |
| Cr | 10.0–20.0 |
| Ni | 0–6.0 |
| Mn | 1.0–3.0 |
| Si | 0.2–1.0 |
| Mg | 0.2–1.0 |
| Ti | 0.2–1.0 |
| Mo/W/Co | 0.2–0.6 |
| Nb/V | 0–0.4 |
| N | 0.04–0.2 |
| C | 0–0.2 |
| Al | <.5. |

4. The welding wire of claim 3, wherein said core composition and the metal sheath composition further comprise:

| Element/Compound | Percentage of Total Wire |
|---|---|
| $CaF_2$ | 0–6.0 |
| $TiO_2$ | 0–5.0 |
| $SiO_2$ | 0–3.0 |
| $Na_3AlF_6$ | 0–1.5 |
| CaO | 0.5–1.5 |
| $K_2SiF_6$ | 0.2–1.5 |
| $CaCO_3$ | 0–1.5 |
| $MgCO_3$ | <.5 |
| $Al_2O_3$ | <.5 |
| $K_2O$ | <.5 |
| $Na_2O$ | <.5 |
| $Fe_2O_3$ | <.5 |
| FeO | <.5 |
| $ZrO_2$ | <.5 |
| $V_2O_5$ | <.5 |
| MnO | <.5. |

5. The welding wire of claim 1, wherein the metal sheath is made of series 300 or 400 stainless steel.

6. The welding wire of claim 1, wherein a concentration of Cr is selected from the range between about 12% Wt and 19% Wt.

7. A welding apparatus comprising:
   a welding gun having means for feeding an electrode into the welding gun and having means for shielding the electrode with a shielding gun;
   the electrode comprising a metal sheath encapsulating a flux core having a core composition, the core composition alloyed with a combination of alloying elements comprising between about 10% Wt and 20% Wt of Cr and between about 0.04% Wt and about 0.2% Wt of N, the flux core comprising between about 10% Wt and 50% Wt of the total weight of the electrode, the metal sheath comprising between 50% Wt and 90% Wt of the electrode; and
   a power source for supplying electrical current to the electrode.

8. The welding apparatus of claim 7, further comprising a gas source supplying the shielding gas to the welding apparatus.

9. The welding apparatus of claim 8, wherein the shielding gas is $CO_2$ or a combination of Ar and between about 5% and 25% of $CO_2$.

10. The welding apparatus of claim 7, wherein the welding process is flux core arc welding.

11. The welding apparatus of claim 7, wherein the means for feeding the electrode into the welding gun comprises a wire drive and a wire reel.

12. The welding apparatus of claim 7 wherein at least one of the alloying elements is N in the amount from about 0.07% Wt to about 0.12% Wt.

13. A method of producing a weld on a work piece, the method comprising:
   providing a welding apparatus having a means for feeding a consumable electrode into the welding apparatus and a means for supplying a shielding gas into the welding apparatus;
   providing the consumable electrode comprising a metal sheath encapsulating a flux core having a core composition, the core composition alloyed with a combination of alloying elements comprising between about 10% Wt and 20% Wt of Cr and between about 0.04% Wt and about 0.2% Wt of N, the flux core comprising between about 10% Wt and 50% Wt of the total weight of the electrode, the metal sheath comprising between 50% Wt and 90% Wt of the electrode;
   feeding the electrode into the welding apparatus and generating an arc to melt an electrode tip; and
   producing the weld by causing the molten electrode tip to transfer to the work tip while supplying a shielding gas to the welding apparatus to shield the electrode and the arc.

14. The method of claim 13, wherein the welding process is a flux core arc welding process.

15. The method of claim 13, wherein generating the arc comprises connecting the welding apparatus to an external power source.

16. The method of claim 13, wherein the means for supplying the shielding gas comprises an external gas source.

17. The method of claim 13, wherein the shielding gas comprises $CO_2$ or a combination of Ar and between about 5% and 25% of $CO_2$.

18. The method of claim 13, wherein at least one of the alloying elements is N in the amount from about 0.07% Wt to about 0.21% Wt.

19. The method of claim 13, wherein at least one of the alloying elements is Cr in the amount of from about 12% Wt 19% Wt.

20. A gas shielded welding process comprising:
   creating a first weld deposit on a work piece (low alloy steel roll) using a welding apparatus and a first consumable electrode comprising between about 18% Wt and 19% Wt of Cr and about 0.07% Wt to 0.08 Wt % of N, the first weld deposit having about 12% to 13% of Cr; and
   creating a second weld deposit over the first weld deposit using the welding apparatus and a second consumable electrode comprising about 12% Wt to 13% Wt of Cr and about 0.07 to 0.12% Wt of N.

21. The process of claim 20, wherein the composition of the first weld deposit and the second weld deposit is of the following ranges:

| Element | Percentage |
|---|---|
| C | 0.03–0.2 |
| Cu | 0–0.1 |
| Al | 0–0.1 |
| Mn | 0.5–1.5 |
| Cr | 11.0–13.5 |
| Ti | 0–0.1 |
| Ni | 1.0–3.0 |
| Nb/V | 0.1–0.4 |
| Si | 0.2–1.0 |
| Mo/W/Co | 0.1–0.4 |
| N | 0.05–0.15. |

22. The process of claim 20, wherein the first electrode comprises a first core and a first sheath having a composition selected from the following ranges:

| Element/Compound | Percentage of Total Wire |
|---|---|
| Fe | 50.0–75.0 |
| Cr | 10.0–20.0 |
| Ni | 0–6.0 |
| Mn | 1.0–3.0 |
| Si | 0.2–1.0 |
| Mg | 0.2–1.0 |
| Ti | 0.2–1.0 |
| Mo/W/Co | 0.2–0.6 |

-continued

| Element/Compound | Percentage of Total Wire |
|---|---|
| Nb/V | 0–0.4 |
| N | 0.04–0.2 |
| C | 0–0.2 |
| Al | <.5. |

23. The process of claim 20, wherein the second electrode comprises a second core and a second sheath having a composition selected from the following ranges:

| Element/Compound | Percentage of Total Wire |
|---|---|
| Fe | 50.0–75.0 |
| Cr | 10.0–20.0 |
| Ni | 0–6.0 |

-continued

| Element/Compound | Percentage of Total Wire |
|---|---|
| Mn | 1.0–3.0 |
| Si | 0.2–1.0 |
| Mg | 0.2–1.0 |
| Ti | 0.2–1.0 |
| Mo/W/Co | 0.2–0.6 |
| Nb/V | 0–0.4 |
| N | 0.04–0.2 |
| C | 0–0.2 |
| Al | <.5. |

24. The process of claim 20, wherein the work piece is a steel mill roll having a diameter of about 12 inches or less.

25. The method of claim 13, wherein the work piece is a steel mill roll having a diameter of about 12 inches or less.

* * * * *